Mar. 3, 1925.
F. K. ROGERS
1,528,304
COMBINED BUMPER AND SHOCK ABSORBER
Filed Feb. 12, 1924
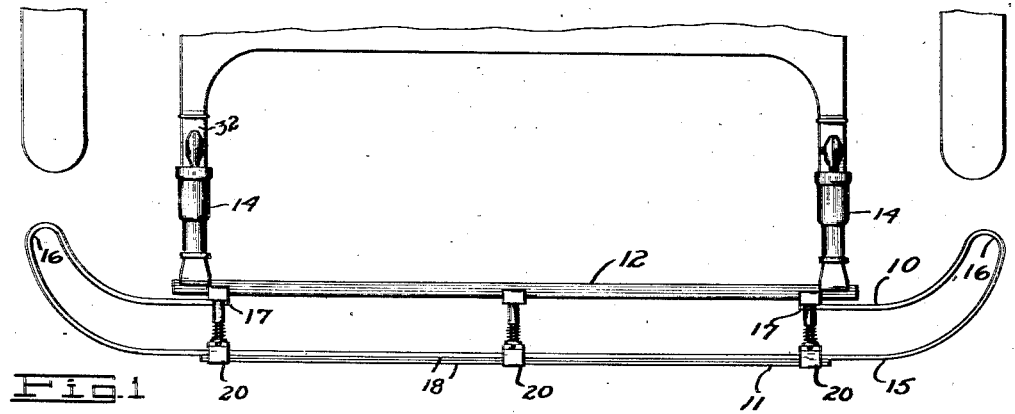
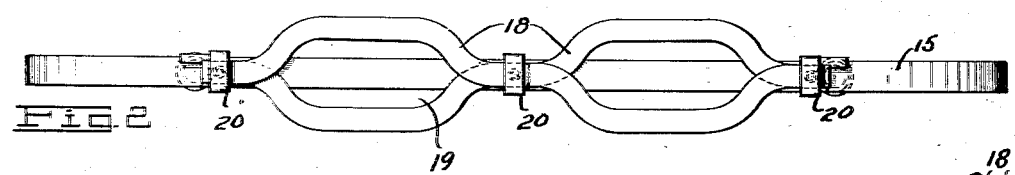
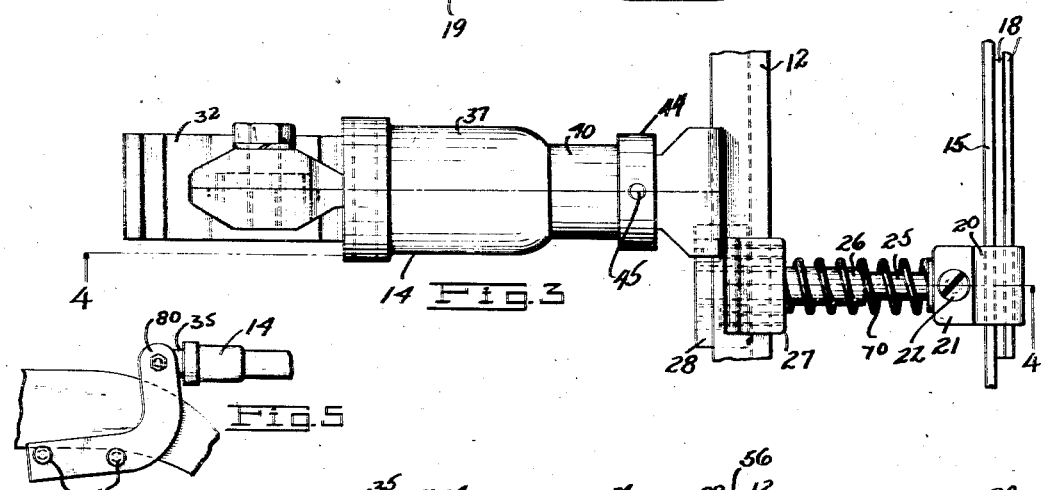
INVENTOR.
FRANK K. ROGERS.
BY
B. J. Craig
ATTORNEY.

Patented Mar. 3, 1925.

1,528,304

UNITED STATES PATENT OFFICE.

FRANK K. ROGERS, OF LOS ANGELES, CALIFORNIA.

COMBINED BUMPER AND SHOCK ABSORBER.

Application filed February 12, 1924. Serial No. 692,263.

*To all whom it may concern:*

Be it known that I, FRANK K. ROGERS, a citizen of the United States, residing at Los Angeles, in the county of Los Angeles and State of California, have invented a certain new and useful Improvement in Combined Bumpers and Shock Absorbers, of which the following is a full, clear, and exact description, reference being had to the accompanying drawings.

This invention relates to combined bumper and shock absorbers for vehicles.

The general object of the invention is to provide a bumper and shock absorber whereby in the parts are so related that under a light impact certain resilient members will function and wherein under increased pressure other resilient members will function.

Another object of the invention is to provide a bumper including a supporting bar having means mounted thereon for attachment to an automobile and wherein the attaching member includes a resilient spring which serves to hold the bumper upon the supporting bar and also serves to cushion the bumper.

A further object of the invention is to provide a bumper with novel means for attaching it to an automobile.

A further object of the invention is to provide an improved automobile bumper including a supporting bar having a resilient attaching member thereon together with a resilient bent metal bumper bar secured to the resilient attaching member and wherein the resilient bumper bar and the resilient attaching member coact in operation to cushion impact.

An additional object of the invention is to provide an automobile bumper together with supporting and attaching means wherein the bumper bar itself, the supporting means and the attaching means all include resilient portions which serve to cushion the impact.

Other objects of the invention will be apparent from the following description taken in connection with the accompanying drawing wherein Fig. 1 is a top plan view of a portion of an automobile showing my improved bumper applied thereto; Fig. 2 is a front elevation of the bumper; Fig. 3 is a fragmentary top plan view of the bumper showing the details of the fastening means; Fig. 4 is a section taken on line 4—4, Fig. 3, and Fig. 5 is a fragmentary elevation showing a modified means for attaching my bumper.

The present invention is an improvement on my prior Patent Number 1,456,281, patented May 22, 1923.

Referring to the drawing by reference characters I have shown the bumper at 10. The bumper comprises a bumper bar 11, a supporting bar 12 and attaching members 14. The bumper bar comprises a flexible strip 15 preferably made of metal having reversely bent end portions 16 and having the free ends 17 secured adjacent the supporting bar 12.

Adjacent the front of the bumper bar 15 I show a pair of sinuously curved bars 18 which are secured to the bumper bar. The bars 18 provide a pair of adjacent substantially elliptical portions 19 as shown in Fig. 2. The end portions of the bars 18 are secured beneath a clamping member 20 as shown in Fig. 4. The clamping member also surrounds the bumper bar 15 and is provided with two projections 21 which are adapted to receive a bolt therethrough. The bolt serves to connect the clamp 20 to a supporting rod 25 in such a manner that the rod 25 has a slight pivotal movement. By referring to Fig. 1 it will be noted that I provide three of the clamps 20 although more or less may be used if desired. The supporting rods 25 are provided with a bushing 26 which fits within a pair of fastening members 27 and 28.

The supporting member 12 as shown in the drawings is an angle iron and the members 27 and 28 may be secured to the angle iron by means of suitable fastening members such as bolts or screws which may pass through the fastening members 27 and 28 and through the angle iron 12. The rod 25 and the sleeve 26 may be secured together by means of a pin 30.

In order to resiliently maintain the supporting bar 12 in service position I provide on the automobile frame 31 in Fig. 4 a bracket 32 which may be secured in any desired manner. This bracket is provided with a shaft 33 thereon which has secured thereon a collar member 34 having a tubular projection 35 thereon. The joint provided by the parts 33, 34 and 35 is similar to the joint provided in my prior patent, previously mentioned.

The tubular projection 35 is shown as having a tubular member 37 fitted thereover. The members 35 and 37 may be secured together by means of a suitable fastening member 38. Within the member 37 I mount a sliding member 40. The tubular member 37 and the sliding member 40 are provided with shoulders 41 and 42, which engage to prevent removal of the tubular member 40.

The end of the tubular member 40 is provided with collar 44 through which a pin 45 extends. Mounted upon the pin 45 I show a pair of clamping members 50. Each of the clamping members is provided with an aperture 51 which receives the pin 45 intermediate its length. One end of each clamping member 50 is provided with an inclined face 54 while the other end of each clamping member is provided with a shoulder 56 which engages the angle bar 12 and firmly holds it in position.

The inclined faces 54 of the clamping members 50 may be spread apart in any desired manner but I now prefer to provide a wedge shaped member 60 which is provided with a tubular protuberance 61. A suitable spring 62 is shown as fitted over the protuberance 61 and this spring normally forces the wedge shaped member 60 against the inclined surfaces 54.

The shaft 25 of the collar 26 is also adapted to have a spring 70 arranged thereon.

From the foregoing description it will be apparent that when the bumper 10 is struck the bumper bar 15 will be flexed. At the same time the springs 70 will be flexed and upon increased pressure the springs 62 will flex. It will thus be seen that my bumper is in effect a combined bumper and shock absorber and a compound spring effect is produced.

In some instances the attachment shown at 31 and 32 in Fig. 4 may not be suitable for mounting my bumper on an automobile and in such a case I may use other fastening means one of which is shown at 80 in Fig. 5. This mounting may comprise a metal stamping or casting which may be secured to a portion of an automobile by means of fastening members such as hook-bolts 81.

Having thus described my invention, I claim:

1. In combination with an automobile bumper, a supporting member, an attaching member for securing the supporting member on an automobile, said attaching member comprising two arms swingingly mounted and adapted to move together to engage the supporting member and means to urge said arms together.

2. In an automobile bumper, in combination, a resilient bumper bar and a supporting member for the resilient bar, a pair of reversely curved sinuous bars, means to secure said curved bars to the bumper bar, said means comprising a U-shaped clamp surrounding all of the bars, said clamp including two spaced arms, said supporting member having a part thereof arranged between said arms.

3. In an automobile bumper, a bumper bar and a supporting bar, means to connect said bumper bar to said supporting bar, said means including a pair of sliding members one secured to the bumper bar and the other secured to the supporting bar and means cooperative with said sliding members for normally urging said bars apart.

4. In an automobile bumper in combination, a bumper bar, a supporting member, said bar and said member being spaced apart, a connecting device comprising sliding parts, a clamp for securing the connecting device to the supporting bar, a spring for urging said clamp to engaging position, said spring also serving to cushion impact.

5. In an automobile bumper, in combination a resilient bumper bar, a supporting member, a resilient connection between said supporting member and said bar, a connecting device, a clamp for securing the connecting device to the supporting bar, a spring for urging said clamp to engaging position, said spring also serving to cushion impact.

6. In an automobile bumper, a bumper bar, a supporting member therefor, an attaching member for securing the supporting member on an automobile, said attaching member comprising a pair of telescopic portions, a spring for normally urging said telescopic portions apart, and means for clamping the attaching member to the supporting member, said means being actuated by said spring to hold said parts in engagement.

7. In combination with an automobile, a bumper including a supporting member, an attaching member engaging the supporting member for securing the bumper on an automobile, a pair of arms, said arms being supported by the attaching member, means to urge said arms into engagement with the supporting member, said means comprising a coiled spring, a sleeve in which said support is mounted, said spring serving to cushion impact against said bumper.

8. In combination with an automobile bumper, a supporting member, an attaching member for securing the supporting member on an automobile, two arms supported by the attaching member and adapted to move together to engage the supporting member and means to urge said arms together, said arms each having an inclined face and a clamping member for engaging said inclined faces and forcing them apart to cause the attaching member to engage the supporting member.

9. In combination with an automobile bumper, a supporting member, an attaching member for securing the supporting member to an automobile, two arms supported by the attaching member and adapted to move together to engage the supporting member and means to urge said arms together, said arms each having an inclined face, a clamping member for engaging said inclined faces and forcing them apart to cause the attaching member to engage the supporting member, a spring for acting on said last mentioned member, a pair of sleeves in which said spring is contained, said sleeves being telescopically arranged and one of said sleeves being secured to said clamp and the other of said sleeves being secured upon the automobile.

10. In combination, a bumper bar and a supporting bar therefore, said bumper bar comprising a strip of resilient material and said supporting bar comprising an angle iron, means to yieldingly connect said bumper bar and said supporting bar in spaced relation, means to attach said supporting bar to an automobile, said means including a cylinder adapted to be secured to an automobile, a second cylinder slidable within the first cylinder, a spring within said second cylinder, a clamp engaging said angle iron, and having a part thereof within said second cylinder, said clamp being mounted for pivotal movement and means whereby said spring urges said clamp into engagement with said angular bar, said spring also serving to resiliently support said bumper in position.

In testimony whereof, I hereunto affix my signature.

FRANK K. ROGERS.